No. 669,793. Patented Mar. 12, 1901.
W. C. HILLIARD.
SPRING VEHICLE WHEEL.
(Application filed Dec. 13, 1900.)
(No Model.)

Witnesses.
H. M. Sturgeon.
F. J. Barrette.

Inventor.
William C. Hilliard
By H. M. Sturgeon
Atty.

THE NORRIS PETERS CO., PHOTO-LITHO., WASHINGTON, D. C.

UNITED STATES PATENT OFFICE.

WILLIAM C. HILLIARD, OF SPARTANSBURG, PENNSYLVANIA.

SPRING VEHICLE-WHEEL.

SPECIFICATION forming part of Letters Patent No. 669,793, dated March 12, 1901.

Application filed December 13, 1900. Serial No. 39,711. (No model.)

*To all whom it may concern:*

Be it known that I, WILLIAM C. HILLIARD, a citizen of the United States, residing at Spartansburg, in the county of Crawford and State of Pennsylvania, have invented certain new and useful Improvements in Spring Vehicle-Wheels; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

My invention relates to improvements in spring vehicle-wheels, and has for its object the construction of a wheel with a double tread, each part of which is mounted upon spring-spokes, whereby the rim will accommodate itself to obstructions in a roadway and pass over any such obstruction with less jar than is the case when a single-rimmed wheel encounters them, as under such circumstances the weight on the axle is divided between the two or more rims, one of which may be on level ground, while the others are in a rut.

The construction and operation of my invention is hereinafter set forth and described, and illustrated in the accompanying drawings, in which—

Figure 1:
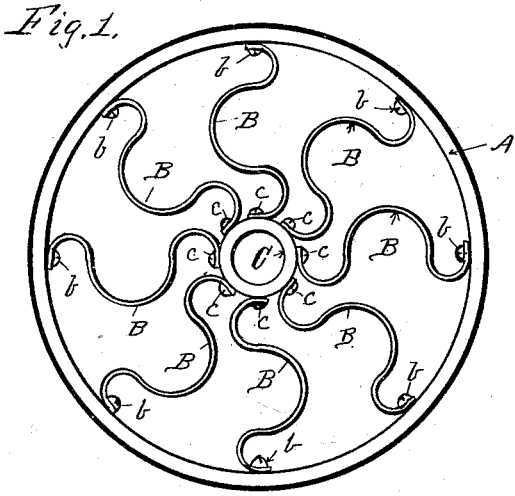
Figure 2:
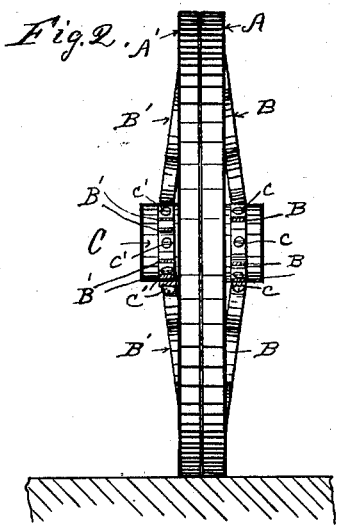
Figure 3:
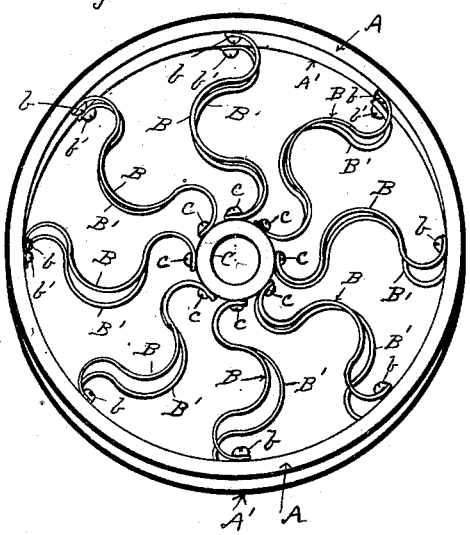
Figure 4:
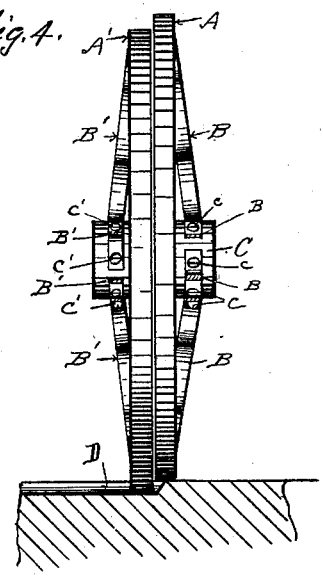

Figure 1 is a side view in elevation of a spring vehicle-wheel embodying my invention. Fig. 2 is a peripheral view of the same in elevation with a portion of the spring-spokes broken away. Fig. 3 is a side view of the same in elevation, illustrating its operation. Fig. 4 is a peripheral view of the same in elevation with a portion of the spring-spokes broken away, illustrating its operation.

In the drawings thus illustrating my invention, A A' are two independent rims placed side by side, and C is the hub of the wheel. From each of said rims A A' leaf-spring spokes B and B' extend to the hub C, which are secured to the rims A A' by means of screws *b b'* and to the hub C by means of screws *c c'* or in any other convenient manner. These springs B and B' are secured to the hub C so that their outer ends incline inward, and each alternate spring is secured to the opposite rim A or A', as the case may be, so as to operate on the rims A and A' to brace them toward each other and retain the rims in proper relation to each other. The springs B B', I preferably make S-shaped and of flat spring-steel; but they may be made in any other form desired, as the particular form of spring-spoke used is not an essential feature of my invention.

In Figs. 1 and 2 I show the operation of the wheel on a smooth roadway, and in Figs 3 and 4 I show the operation of the wheel in passing over ruts or other obstructions in the roadway. In this case the larger portion of the load would be upon the rim A when the rim A' was in a depression D in the roadway. Consequently much less jar would be caused than when an ordinary wheel-rim dropped into such rut or depression.

I have thus shown and described a convenient construction of a spring vehicle-wheel embodying my invention, so as to enable others to utilize the same.

What I claim as new, and desire to secure by Letters Patent of the United States, is—

1. The combination in a spring vehicle-wheel, of a wheel-hub, two or more wheel-rims side by side, spring-spokes secured to said hub, and inclined at the outer ends toward each other and secured to said wheel-rims, substantially as and for the purpose set forth.

2. The combination in a spring vehicle-wheel, of a wheel-hub, two wheel-rims side by side, two rows of spring-spokes secured to said hub so that they incline toward each other, and having the outer ends of alternate spring-spokes secured to one rim and the ends of the other alternate spring-spokes secured to the other rim, substantially as and for the purpose set forth.

3. The combination in a spring vehicle-wheel, of a hub, two wheel-rims side by side, two rows of S-shaped leaf-springs secured to said hub so that their outer ends incline toward each other, and having their outer ends secured to said wheel-rims, substantially as and for the purpose set forth.

In testimony whereof I affix my signature in presence of two witnesses.

WILLIAM C. HILLIARD.

Witnesses:
C. T. WAGGONER,
C. H. GABRIEL.